June 4, 1929. W. B. LASKEY 1,715,662
THERMOSTATICALLY OPERATED MIXING VALVE
Original Filed Aug. 1, 1925  2 Sheets-Sheet 1
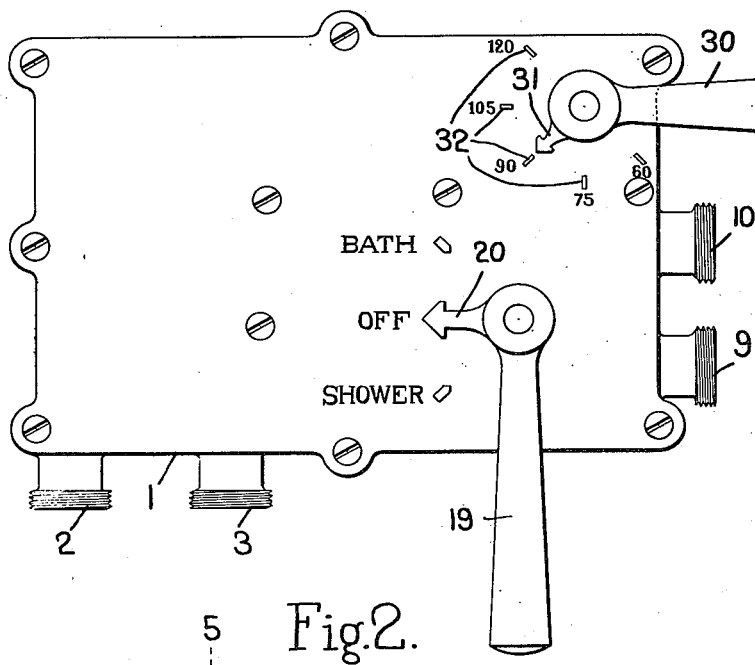
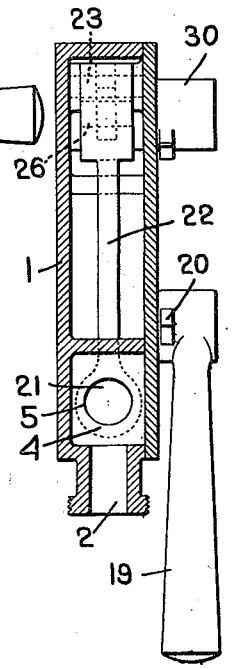
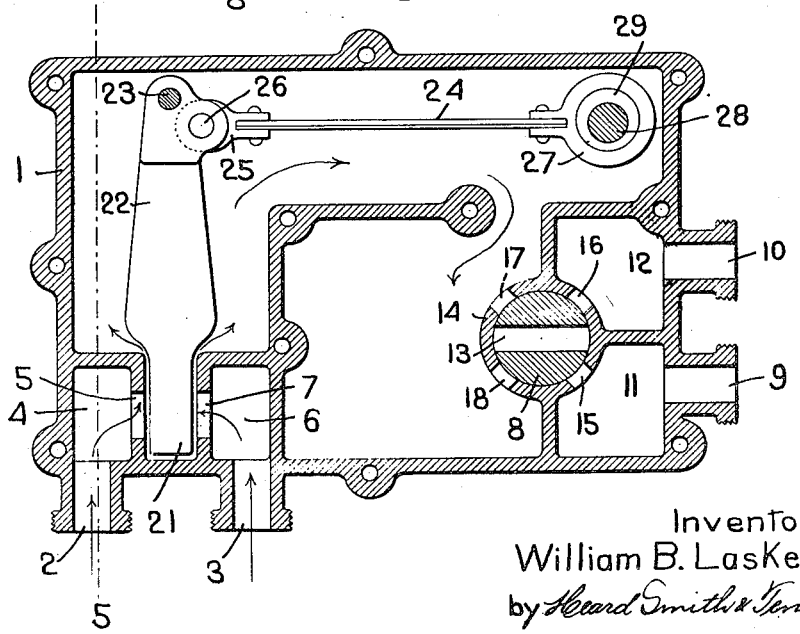
Inventor.
William B. Laskey June 4, 1929.  W. B. LASKEY  1,715,662

THERMOSTATICALLY OPERATED MIXING VALVE

Original Filed Aug. 1, 1925   2 Sheets-Sheet 2

Inventor
William B. Laskey
by Heard Smith & Tennant.
Attys.

Patented June 4, 1929.

1,715,662

UNITED STATES PATENT OFFICE.

WILLIAM B. LASKEY, OF BROOKLYN, NEW YORK; ROSE D. LASKEY EXECUTRIX OF SAID WILLIAM B. LASKEY, DECEASED.

THERMOSTATICALLY-OPERATED MIXING VALVE.

Application filed August 1, 1925, Serial No. 47,465. Renewed April 10, 1929.

This invention relates to a mixing valve especially adapted for use in a bathroom for mixing hot and cold water and it has for its object to provide a novel valve of this nature which is thermostatically controlled so that the mixture which is delivered will always be maintained at a desired temperature. The device comprises a valve casing having a hot water inlet port and a cold water inlet port and also having a discharge port, a valve controlling the discharge port, and a thermostatically-operated valve controlling the inlet ports and arranged so that it will allow the ingress of the proper relative amounts of hot water and cold water to maintain the mixture at the desired temperature.

In order to give an understanding of the invention I have illustrated in the drawings some selected embodiments thereof which will now be described after which the novel features will be pointed out in the appended claim.

Fig. 1 is a front elevation of a valve device embodying the invention;

Fig. 2 is a sectional view showing one form of the device;

Fig. 5 is a section on the line 5—5, Fig. 2.

Figure 3:
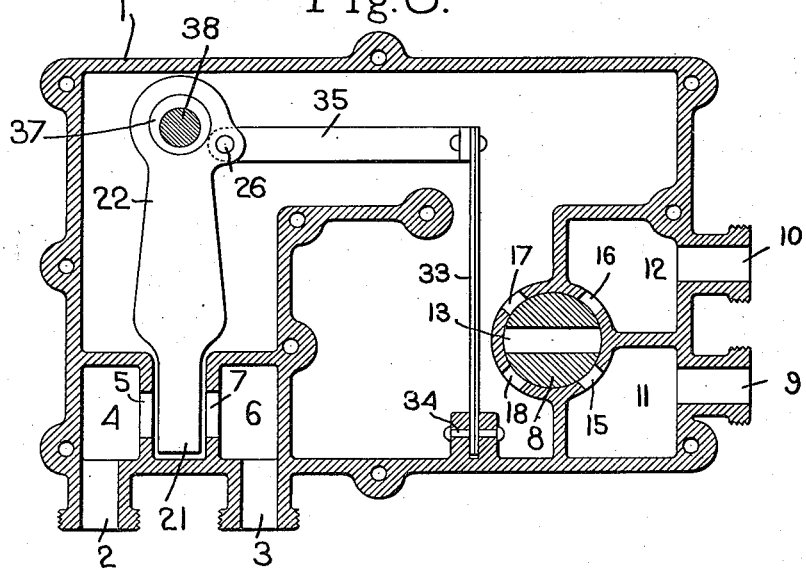
Fig. 3 is a similar sectional view showing a different embodiment of the invention.

The device herein illustrated comprises a casing 1 in which the valves are received and the interior of which constitutes a mixing chamber. This casing has a hot water connection 2 and a cold water connection 3. The hot water connection leads into a chamber 4 provided with a hot water inlet port 5 through which the hot water is delivered to the interior of the casing. The cold water inlet connection leads to another chamber 6 which has a cold water inlet port 7 that also leads into the interior of the casing. These inlet ports 6 and 7 are controlled by a thermostatically-operated valve as will be presently described.

The discharge from the casing is controlled by a valve 8 and in the present embodiment the valve arrangement is such that the water can be discharged from the casing through either of two discharge connections 9 and 10, one of which may lead to the bath tub and the other to the shower or spray device. These two discharge connections 9 and 10 communicate with two discharge chambers 11 and 12 and the valve 8 is adapted to connect either chamber 11 or 12 with the interior of the casing. While the valve 8 may be of any suitable construction I have herein shown it as an ordinary plug valve having a transverse port 13 and which rotates in a housing 14 situated within the casing. This housing is provided with a port 15 leading to the chamber 11 and with a port 16 leading to the chamber 12 and it is also provided with other ports 17 and 18 which are situated diametrically opposite to the ports 15 and 16. When the valve plug 8 is in the position shown in Fig. 1 the valve is closed but by turning the plug one way or the other either chamber 11 or 12 can be thrown into communication with the interior of the casing so that water will be delivered through either of the connections 9 or 10 as desired.

The valve plug is operated by a suitable handle 19 and I will preferably provide said handle with an index pointer 20 and provide the casing exteriorly with indicating points which are labeled "bath", "off" and "shower." By swinging the handle 19 to bring the indicator 20 into line with the various indicating points the discharge from the valve will be controlled as desired.

The thermostatically-operated valve which controls the inlet ports 5 and 7 is indicated at 21. These ports are situated in opposition to each other and the valve 21 is situated between them. When said valve is centrally between the ports both ports will be opened and both hot water and cold water will be admitted to the interior of the casing. If the valve is moved to the left Figs. 2, 3 and 4 it will close the hot water inlet while if it is moved to the right it will close the cold water inlet.

This valve is carried by an arm 22 which is pivoted to the casing at 23 and the valve is acted upon by a suitable thermostatic device so that it will control the relative amounts of hot and cold water which are admitted to the casing thereby to maintain the mixture at a desired temperature. Various forms of thermostatic devices may be employed without departing from the invention.

In Fig. 2 I have shown a thermostatic device 24 of the well known construction involving two strips of metal secured together which have different co-efficients of expansion. One end of this thermostatic element is secured to a head 25 which is pivoted to the arm 22 at 26. The other end is connected to a collar 27 which is mounted on and anchored to a stud 28.

In operation a thermostatic element of this type will flex one way or the other as the temperature changes. The thermostatic element, it will be noted, is located within the casing and is thus surrounded by the mixture of hot water and cold water which is admitted to the casing and, therefore, it will be influenced by the temperature of the mixture.

An adjustment is provided so that the thermostatic element may be set for any desired temperature. This adjustment is in the form of an eccentric 29 which is mounted on the stud 28 and on which the collar 27 is in turn mounted. The eccentric sleeve 29 has a lever 30 secured thereto which is situated on the outside of the casing and by which the eccentric may be turned thereby to adjust the position of the thermostatic member 24 in the direction of its length.

Assuming that the thermostatic element has been adjusted for a temperature of 90° F. for instance, then if when the valve 8 is opened and water begins to flow through the casing to the discharge the temperature of the mixture increases, the end of the thermostatic element 26 which is connected to the lever 22, will tend to flex or bend downwardly and this will swing the valve 21 toward the left, thereby to cut down the flow of hot water through the port 5 and correspondingly open the cold water inlet port 7 and increase the flow of cold water. This changing of the proportion of hot water and cold water will reduce the temperature of the mixture in the casing and such reduction of temperature will cause a flexing of the thermostat in the opposite direction thereby again to vary the relative sizes of the inlet ports 5 and 7. The valve will thus automatically maintain the correct relative proportional flow through the two ports 5 and 7 to maintain the mixture in the two ports at the desired temperature.

The operation of the temperature-adjusting dvice will be apparent. As the eccentric 29 is turned the collar 27 will be moved slightly in the direction of length of the thermostatic element and such movement will be communicated to the valve so that the normal position of the valve relative to the ports 5 and 7 is determined by the position of the temperature-controlling handle 30. When the handle is in the position shown in Fig. 1 the cold water inlet port 7 will be opened to a greater extent than the hot water inlet port 5 and consequently the mixture will be maintained at a relatively low temperature. By swinging the handle 30 clockwise and turning the eccentric 29 in a corresponding direction the position of the thermostatic element 24 is changed and the normal position of the valve 21 will consequently be changed thus varying the temperature of the mixture which will be normally admitted to the casing.

The handle 30 is provided with an index pointer 31 and the casing is formed with indicating marks 32 indicating various degrees of temperature. These are so arranged that if, for instance, the party wishes to draw water at a temperature of 90° he will turn the handle to bring the index finger 21 to the 90° index point and this will so adjust the thermostatic element and the normal position of the valve 21 so that the 90° temperature will be automatically maintained.

Fig. 13 illustrates a device similar to Fig. 2 except for the manner of mounting the thermostatic element. The thermostatic element in this embodiment is shown at 33 and it is secured at one end to the casing as shown at 34 and at the other end to a link 35 which is pivotally connected to the lever 22 at 36. In this case also the thermostatic element is situated within the mixed hot and cold water and thus influenced by the temperature of the mixture and as the temperature varies the thermostatic element will operate to adjust the valve 21 to maintain the desired mixture. In this embodiment the temperature adjustment is associated with the lever 22. This lever is pivotally mounted on an eccentric 37 which in turn is mounted on a stud 38 carried by the casing. The eccentric 37 can be adjusted in a manner similar to the eccentric 29 and by this adjustment the thermostat may be fixed slightly one way or the other from its normal position so that it will control the valve 21 in such a way as to maintain the desired temperature in the casing.

Figure 4:
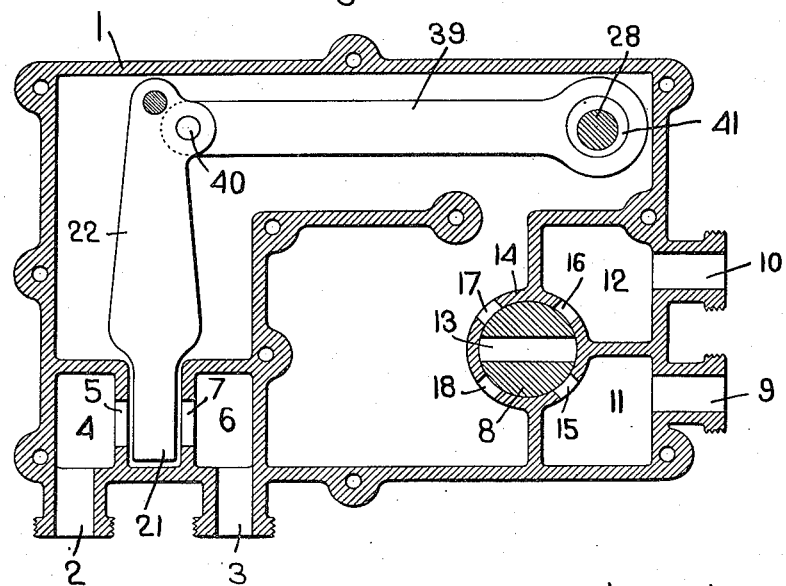
Fig. 4 is a sectional view showing still another embodiment of the invention.

Fig. 4 shows a different embodiment of the invention wherein the thermostatic element is simply a zinc bar 39 which is pivoted at one end to the lever 22 as shown at 40 and the other end is connected to the eccentric 41 which is pivoted on the stud 28. This zinc will expand and contract longitudinally by changes in temperature and as it expands it will tend to close the hot water inlet port while as it contracts it will tend to close the cold water inlet port.

The eccentric provides for adjusting the position of the thermostatic member 39 so that it will function properly to give the desired temperature for which the temperature control lever is set.

I claim:

In a thermostatically-operated mixing valve, the combination with a casing having a mixing chamber provided with a recess having opposed parallel walls, one of which has a hot water inlet port therein and the other of which has a cold water inlet port therein, said chamber having a discharge port leading therefrom, of an arm pivotally mounted within the mixing chamber and having its end situated in said recess, said end constituting a valve for controlling said ports and having its opposite faces parallel to the ported walls of the recess, a thermostatic element in the mixing chamber connected to said arm adjacent to but eccentrically of its pivot, said thermostatic element operating the valve to control the relative amounts of hot and cold water which are admitted to the mixing chamber.

In testimony whereof I have signed my name to this specification.

WILLIAM B. LASKEY.